US012782304B2

United States Patent
(12) United States Patent
Han et al.

(10) Patent No.: US 12,782,304 B2
(45) Date of Patent: Nov. 3, 2026

(54) SYSTEM AND METHOD FOR STUDYING AND TESTING THE BOILING BUBBLE BEHAVIOR CHARACTERISTICS OF MIXED WORKING FLUIDS

(71) Applicant: CHINA UNIVERSITY OF PETROLEUM (EAST CHINA), Qingdao (CN)

(72) Inventors: Hui Han, Qingdao (CN); Liang Liu, Qingdao (CN); Yuxing Li, Qingdao (CN); Jianlu Zhu, Qingdao (CN); Zhengxiong Su, Qingdao (CN); Yifan Du, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 331 days.

(21) Appl. No.: 18/718,147

(22) PCT Filed: Jun. 28, 2023

(86) PCT No.: PCT/CN2023/103036
§ 371 (c)(1),
(2) Date: Jun. 10, 2024

(87) PCT Pub. No.: WO2024/124858
PCT Pub. Date: Jun. 20, 2024

(65) Prior Publication Data
US 2026/0160717 A1 Jun. 11, 2026

(30) Foreign Application Priority Data
Dec. 14, 2022 (CN) ........................ 202211606870.4

(51) Int. Cl.
*G01N 25/08* (2006.01)

(52) U.S. Cl.
CPC ................................ *G01N 25/085* (2013.01)

(58) Field of Classification Search
CPC ...... G01N 25/00; G01N 25/085; G01N 33/00; Y02E 30/30
See application file for complete search history.

(56) References Cited

U.S. PATENT DOCUMENTS 4,380,907 A 4/1983 Barnes et al.

FOREIGN PATENT DOCUMENTS

CN 203132996 U 8/2013
CN 110133037 A 8/2019
(Continued)

OTHER PUBLICATIONS

Huang et al.; "Boiling refrigerant transition and heat transfer characteristics of HFE-7100/water on the hierarchical structured surfaces;" CIESC Journal; 2021; pp. 5510-5519; vol. 72, No. 11.
(Continued)

*Primary Examiner* — Randy W Gibson
(74) *Attorney, Agent, or Firm* — Oliff PLC

(57) ABSTRACT

A system and method for studying and testing the boiling bubble behavior characteristics of mixed working fluids. The system includes a visualization chamber to contain mixed fluids, a heating device to heat the mixed fluids within the visualization chamber to generate boiling bubbles, a gas collection chamber, a constant temperature water bath to cool the boiling bubbles collected by the gas collection chamber to collect boiling bubbles generated in the mixed fluids within the visualization chamber, a third pressure sensor to obtain gas pressure inside the gas collection chamber, a third temperature sensor to obtain temperature of the constant temperature water bath, and a data processing module to determine component concentrations of the boiling bubbles in the mixed fluids based on the gas pressure
(Continued)

inside the gas collection chamber and the temperature of the constant temperature water bath.

18 Claims, 2 Drawing Sheets

(56) References Cited

FOREIGN PATENT DOCUMENTS

| | | | |
|---|---|---|---|
| CN | 110161076 | A | 8/2019 |
| CN | 113218990 | A | 8/2021 |
| CN | 113834849 | A | 12/2021 |
| CN | 217981318 | U | 12/2022 |
| CN | 115791864 | A | 3/2023 |

OTHER PUBLICATIONS

Sep. 19, 2023 Search Report issued in International Patent Application No. PCT/CN2023/103036.

Sep. 19, 2023 Written Opinion of the International Searching Authority issued in International Patent Application No. PCT/CN2023/103036.

SYSTEM AND METHOD FOR STUDYING AND TESTING THE BOILING BUBBLE BEHAVIOR CHARACTERISTICS OF MIXED WORKING FLUIDS

The present invention claims priority to the Chinese patent application submitted to the China National Intellectual Property Administration on Dec. 14, 2022, with the application No. 202211606870.4, titled “system and method for studying and testing the boiling bubble behavior characteristics of mixed working fluids”. The entire contents of this Chinese patent application are incorporated herein by reference and constitute a part of the present invention.

TECHNICAL FIELD

The present invention relates to the field of energy heat exchange technology, particularly to a system and method for studying and testing the boiling bubble behavior characteristics of mixed working fluids.

BACKGROUND

The statements in this section merely provide background information related to the present invention and do not necessarily constitute prior art.

Nucleate boiling, as one of the most efficient heat transfer methods, is widely used in fields requiring extremely high heat transfer rates such as nuclear reactors, the liquefaction of natural gas and hydrogen, and microelectronics technology. Boiling is a phase transition process in which bubbles nucleate and grow continuously on superheated liquid (homogeneous nucleation) or solid-liquid interface (heterogeneous nucleation). In most industrial applications, heterogeneous nucleation occurs when the heating surface reaches a certain degree of superheat. Currently, the boiling heat transfer of binary or multicomponent mixed working fluids is extensively applied in heat exchange systems. A significant advantage of mixed working fluids is that they can achieve desired physical and chemical properties through the manipulation of component types and concentrations. For instance, the phase transition temperature of mixed working fluids can be controlled flexibly and intentionally under constant pressure, providing a wide range of boiling initiation temperatures at a given pressure. However, existing research indicates that due to different boiling points of the components in mixed working fluids, light components in the bubble interface evaporate first during the boiling process. This creates a concentration gradient in the liquid thin layer at the bubble interface, leading to inconsistencies between the concentration of the components in the bubbles and the original liquid components, forming a mass transfer resistance, which results in lower boiling heat transfer performance of the mixture compared to pure substances. The boiling heat transfer performance is closely related to the nucleation, growth, and detachment behaviors of bubbles during the boiling process. The presence of these phenomena makes the existing models of boiling bubble behavior characteristics less applicable to mixed working fluids. Furthermore, there is a need to further develop methods to enhance the boiling heat transfer of mixed working fluids to address their weak heat transfer performance.

The inventors have found that currently, there is a lack of a visualized testing system capable of determining the component concentration inside boiling bubbles of mixed working fluids to study bubble behavior characteristics and enhancement methods.

SUMMARY

To address the aforementioned issues, the present invention proposes a system and method for studying and testing the boiling bubble behavior characteristics of mixed working fluids, which can accurately determine the component concentration within the boiling bubbles and facilitate the study of bubble behavior characteristics.

To achieve the aforementioned objectives, the present invention adopts the following technical solutions:

First aspect: the present invention provides a system for studying and testing the boiling bubble behavior characteristics of mixed fluids, which includes a visualization chamber, a heating device, a constant temperature water bath, a gas collection chamber, a third pressure sensor, a third temperature sensor, and a data processing module;

the visualization chamber is configured to contain the mixed fluids; the heating device is configured to heat the mixed fluids within the visualization chamber to generate boiling bubbles; the gas collection chamber is configured to collect boiling bubbles generated in the mixed fluids within the visualization chamber; the constant temperature water bath is configured to cool the bubbles collected by the gas collection chamber; the third pressure sensor is configured to obtain gas pressure inside the gas collection chamber; the third temperature sensor is configured to obtain temperature of the constant temperature water bath; the data processing module is configured to determine a component concentration of the boiling bubbles in the mixed fluids based on the gas pressure inside the gas collection chamber and the temperature of the constant temperature water bath.

Second aspect: the present invention proposes a method for studying and testing the boiling bubble behavior characteristics of mixed fluids, which includes:

heating the mixed fluids in a visualization chamber using a heating device to generate boiling bubbles;

collecting the boiling bubbles generated in the mixed fluids within the visualization chamber using a gas collection chamber;

cooling the boiling bubbles collected by the gas collection chamber using a constant temperature water bath when a volume of boiling bubbles in the gas collection chamber reaches a set value;

obtaining gas pressure inside the gas collection chamber and temperature of the constant temperature water bath during cooling;

determining component concentration of the boiling bubbles in the mixed fluids based on the gas pressure inside the gas collection chamber and the temperature of the constant temperature water bath.

Compared to existing technologies, the beneficial effects of the present invention include:

1. The present invention can conduct research on the behavior characteristics and enhancement methods of boiling bubbles in mixed working fluids under different conditions of pressure, heat flux density, degree of under cooling, and component concentration, and can also collect boiling bubbles to determine their component concentrations.
2. The present invention reduces experimental errors due to heat leaks from the heating block to the surroundings by machining temperature measurement holes at different distances from the top on the side of the heating block, measuring temperatures at different locations, and calculating the heat flux density and top temperature of the heating block, compared to determining the heat flux density using an adjustable power source.

3. The present invention extends the bubble collection tubing into the mixed fluids within the visualization chamber to collect boiling bubbles, minimizing the impact of evaporation from the liquid surface on the gas collection of boiling bubbles, thereby making the concentration of the obtained boiling bubble component more accurate.
4. To prevent boiling bubbles generated by the heating element itself from affecting the collected mixed working fluid boiling bubbles, the first heating element is placed outside the visualization chamber.

Additional advantages of the present invention will be partially provided in the following description, will become apparent from the following description, or will be learned through the practice of the invention.

BRIEF DESCRIPTION OF THE DRAWINGS

The accompanying drawings to the specification, which form part of the present application, are used to provide a further understanding of the present application, and the illustrative embodiments of the present application and the description thereof are used to explain the present application and are not unduly limiting the present application.

Wherein, 1: visualization chamber; 2: gasket; 3: organic glass window; 4: window compression plate; 5: bolts; 6: injection tubing; 7: injection tubing valve; 8: bubble collection tubing; 9: bubble collection tubing valve; 10: bubble sampling tubing; 11: bubble sampling tubing valve; 12: gas recondensation chamber; 13: condensing coil; 14: condensing water bath; 15: flexible heating sheet; 16: temperature control cabinet; 17: temperature sensor; 18: pressure sensor; 19: fixed column; 20: heating block; 21: heating sheet; 22: adjustable direct current (DC) power source; 23: fixing plate; 24: epoxy resin adhesive; 25: temperature measurement holes in the heating block; 26: gas collection chamber; 27: gas collection chamber valve; 28: constant temperature water bath; 29: third pressure sensor; 30: data processing module; 31: high-speed camera; 32: light source.

DESCRIPTION OF THE PREFERRED EMBODIMENTS

The present invention will be further described below in conjunction with the accompanying drawings and examples.

It should be noted that the following detailed descriptions are all illustrative and intended to provide further clarification of the present invention. Unless otherwise indicated, all technical and scientific terms used herein have the same meaning as commonly understood by one of ordinary skill in the art to which the present application belongs.

Example 1

In the example, a system for studying and testing the boiling bubble behavior characteristics of mixed fluids is disclosed. The system includes a visualization chamber, a heating device, a constant temperature water bath, a gas collection chamber, a third pressure sensor, a third temperature sensor, and a data processing module.

The visualization chamber is configured to contain the mixed fluids; the heating device is configured to heat the mixed fluids within the visualization chamber to generate boiling bubbles; the gas collection chamber is configured to collect boiling bubbles generated in the mixed fluids within the visualization chamber; the constant temperature water bath is configured to cool the bubbles collected by the gas collection chamber; the third pressure sensor is configured to obtain gas pressure inside the gas collection chamber; the third temperature sensor is configured to obtain temperature of the constant temperature water bath; the data processing module is configured to determine a component concentration of the boiling bubbles in the mixed fluids based on the gas pressure inside the gas collection chamber and the temperature of the constant temperature water bath.

Figure 1:
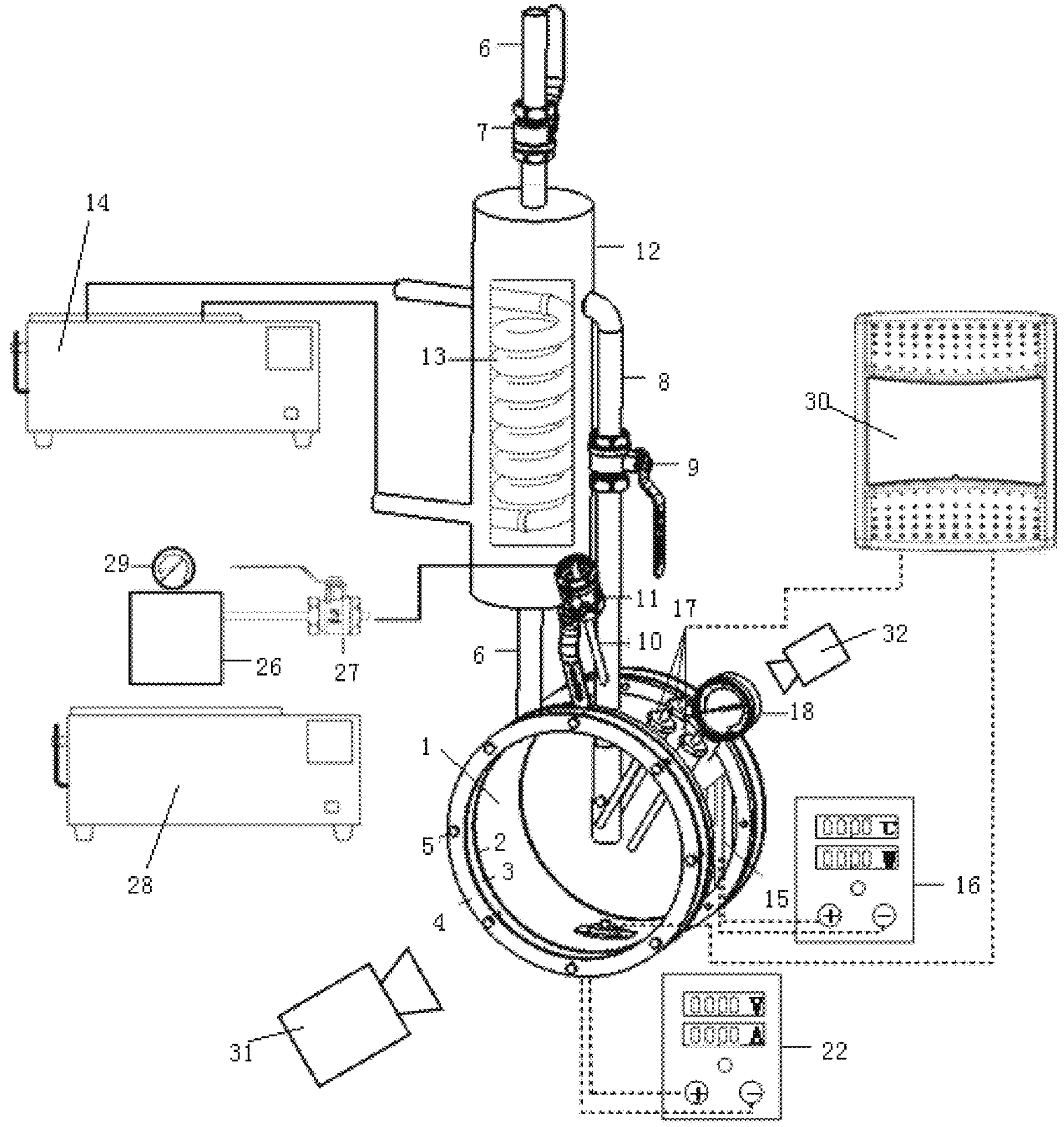
FIG. 1 is a schematic diagram of the system structure disclosed in Example 1.
Figure 2:
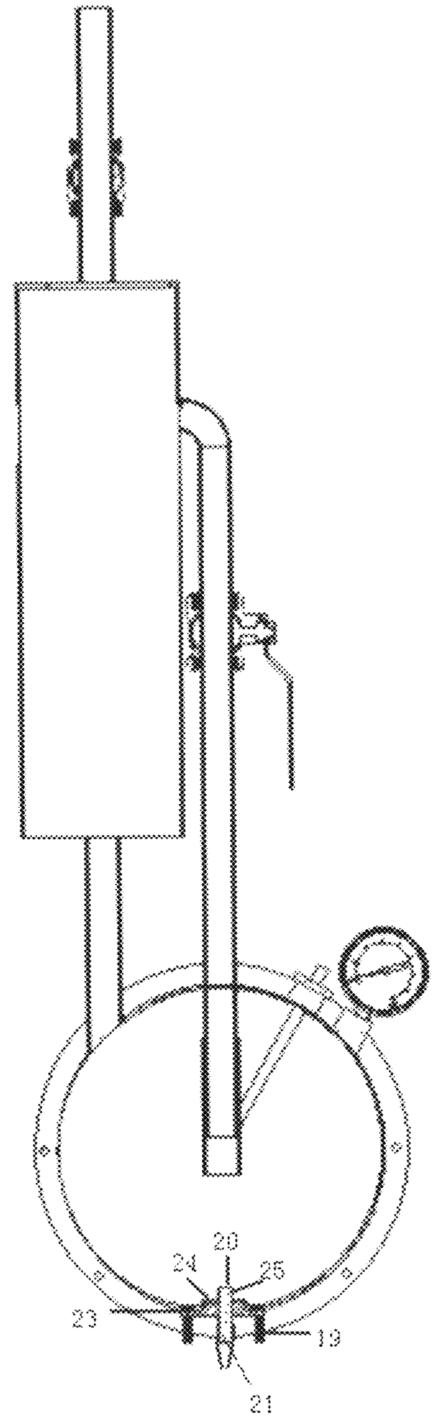
FIG. 2 is a layout diagram of the second heating element disclosed in Example 1.

The example details a system for studying and testing the boiling bubble behavior characteristics of mixed fluids, as shown in FIG. 1 and FIG. 2. The system includes a boiling system, a gas sampling system, and a data collection system.

The boiling system can alter the component concentration, temperature, and pressure of the mixed working fluid, and collect the gas within the boiling bubbles of the mixed working fluids.

Specifically, the boiling system includes a visualization chamber (1) for containing mixed fluids. A heating device is set up on the visualization chamber (1) to heat the mixed fluids inside, thus generating boiling bubbles.

The heating device includes a first heating element and a second heating element. The first heating element is configured to heat the mixed fluids in the visualization chamber to a first temperature value. The second heating element is positioned at the bottom of the internal chamber of the visualization chamber, is configured to further heat the mixed fluids that has reached the first temperature value and maintain the temperature of the second heating element at a second temperature value to make the mixed fluids to generate boiling bubbles.

The first heating element is provided on the outside of the visualization chamber (1), and the mixed fluids in the visualization chamber (1) is heated by the first heating element. The first heating element is provided on the outside of the visualization chamber (1), which can prevent the heating element itself from generating bubbles that have an effect on the collection of boiling bubbles of the mixed working fluids, and effectively ensure the accuracy of the component concentration of the obtained boiling bubbles of the mixed fluids.

Preferably, the first heating element is a flexible heating sheet. The flexible heating sheet (15) is provided on the exterior of the visualization chamber (1) to heat the mixed fluids inside.

To achieve precise heating of the mixed fluids by the first heating element, temperature sensors (17) are provided, which include a first temperature sensor and a fourth temperature sensor. The first temperature sensor is configured to obtain a temperature of the mixed fluids inside the visualization chamber (1), and the fourth temperature sensor is configured to obtain a temperature of the gas space in the visualization chamber (1). To minimize the temperature measurement errors at different points, two first temperature sensors are set to monitor the temperature of the mixed fluids.

The first heating element, the first temperature sensors, and the fourth temperature sensor are all connected to the temperature control cabinet (16). The first heating element is controlled to heat the mixed fluids in the visualization chamber (1) through the temperature control cabinet (16), and the first heating element is controlled to stop heating when the temperature of the mixed fluids obtained by the first temperature sensor reaches a set first temperature value.

The second heating element includes a heating block (20), a heating sheet (21), and a fixing plate (23). The heating sheet (21) is provided at the bottom of heating block (20), which is also connected to the fixing plate (23). The fixing plate (23) is fixed on the bottom of the internal chamber of the visualization chamber (1), and the top of the heating block (20) extends into the mixed fluids.

In order to control the heating of the second heating element, a plurality of second temperature sensors are provided on the second heating element, and the plurality of second temperature sensors are provided at positions at different distances from the top of the second heating element to obtain temperatures at different distances from the top of the second heating element thereof.

The heating sheet (21) is connected to an adjustable DC power source (22), the heating power of the heating sheet (21) is controlled by the adjustable DC power source (22), and by controlling the temperature of the heating sheet (21), the temperature of the second heating element is always maintained at the second temperature value, so as to make the mixed fluids generate boiling bubbles.

In the specific implementation, a lower part of the internal chamber of visualization chamber (1) is welded with four fixed columns (19), which are configured to fix the fixing plate (23). A square hole is cut out in the bottom of the visualization chamber (1), positioned between the fixed columns (19), the square hole allows the heating block (20) to pass through and extend its top into the mixed fluids, thereby enabling the heating of the mixed fluids.

A lower part of the front and rear surfaces of the heating block (20) are bonded to the heating sheet (21) using thermal adhesive. The heating sheet (21) is connected to an adjustable DC power source (22) to regulate output power. Temperature measurement holes (25) are drilled in the sides of the heating block (20) at different heights from the top of the heating block (20) to accommodate the second temperature sensors, and the sensor signal lines are connected to the data processing module (30). The lowest temperature measurement hole should be positioned above the top of the heating sheet (21). The top of heating block (20) can be processed to have surfaces of varying roughness or enhanced surfaces with different micro-nanostructure parameters, as needed. To prevent additional heat conduction caused by direct contact between heating block (20) and visualization chamber (1), fixing plate (23) is used to fix heating block (20), and the fixing plate (23) is then connected to the visualization chamber (1). The material of the fixing plate (23) is polytetrafluoroethylene (PTFE) with a lower thermal conductivity coefficient. The fixing plate (23) is a rectangular cuboid with a square hole through its center. The width of the square hole matches the width of heating block (20) to clamp the heating block (20) in place, and the length of the square hole is slightly longer than that of heating block (20) to allow space for the wiring of the second temperature sensor on the side of the heating block (20). Holes are drilled at the four corners of fixing plate (23) to pass through the fixed columns (19) at the bottom of visualization chamber (1), making the fixing plate (23) fits with the visualization chamber (1). The heating block extends into the visualization chamber (1), and the square hole at the bottom of the visualization chamber (1) is then sealed by the fixing plate (23). The gaps among the visualization chamber (1), the fixing plate (23), and the heating block (20) are sealed with an epoxy resin adhesive with a low thermal conductivity to prevent leakage.

Preferably, the heating block (20) is made of copper and the heating sheet (21) is made of ceramic.

In addition, a first pressure sensor is provided for obtaining a gas pressure inside the visualization chamber (1).

The temperature sensors (17) and the first pressure sensor (18) are specifically mounted as follows: a plurality of threaded joints is welded on the visualization chamber (1), and the temperature sensor (17) and the first pressure sensor (18) are threaded with the corresponding threaded joints, respectively.

Both the front and rear of the visualization chamber (1) are fitted in sequence with gaskets (2), organic glass windows (3), and window compression plate (4), each evenly distributed with eight bolt holes at corresponding positions. Bolts (5) sequentially pass through these holes and are tightened with nuts to compress all four components together.

The visualization chamber (1) is also in fluid communication with an injection tubing (6) and a bubble collection tubing (8), respectively. The mixed working fluid is injected into the visualization chamber (1) through the injection tubing (6). The boiling bubbles generated from the mixed working fluids are collected by the bubble collection tubing (8). Both the bubble collection tubing (8) and the injection tubing (6) are also in fluid communication with a condenser.

The bubble collection tubing (8) is further in fluid communication with one end of a bubble sampling tubing (10) and the other end of the bubble sampling tubing (10) is in fluid communication with a gas collection chamber (26).

Injection tubing valve (7) is provided on the injection tubing (6), bubble collection tubing valve (9) is provided on the bubble collection tubing (8), and bubble sampling tubing valve (11) is provided on the bubble sampling tubing (10). The opening and closing of the corresponding tubing are controlled by each valve. The bubble collection tubing valve (9) is located between the bubble sampling tubing (10) and the condenser, and the injection tubing valve (7) is provided on a tubing that carries the mixed working fluid from the injection tubing into the condenser.

To minimize the impact of evaporation from the liquid surface on the collection of gases from boiling bubbles and ensure the accuracy of the obtained component concentrations of the boiling bubbles, one end of the bubble collection tubing (8) is in fluid communication with the condenser, and the other end is extended into the mixed fluids in the visualization chamber (1), and is located directly above the heating block.

For easy adjustment of the length of the bubble collection tubing (8) to allow it to extend into the mixed fluids in the visualization chamber (1), the bubble collection tubing (8) is designed as a sleeve that can be extended or retracted. The length of the bubble collection tubing (8) is adjusted by stretching or retracting the sleeve, and adjacent tubings are connected and fixed by a fixed pin provided.

The bubble sampling tubing (10) is in fluid communication with the bubble collection tubing (8) near the visualization chamber.

Moreover, an insulating layer is wrapped around the external parts of the visualization chamber, the bubble collection tubing (8), and the bubble sampling tubing (10) to minimize heat exchange with the environment.

The condenser includes a gas recondensation chamber (12), a condensing coil (13), and a condensing water bath (14). The condensing coil (13) is located inside the gas recondensation chamber (12), and both ends of the condensing coil (13) are respectively in fluid communication with the condensing water bath (14). The injection tubing (6) and the bubble collection tubing (8) are both in fluid communication with the gas recondensation chamber (12). Through the injection tubing (6) and the bubble collection tubing (8), the mixed fluids and the boiling bubbles of the mixed fluids are passed into the gas recondensation chamber (12). Condensed liquid in the condensing water bath (14) is entered into the condensing coil (13) to condense and cool the mixed fluids and the boiling bubbles in the gas recondensation chamber (12), thereby adjusting the temperature of the mixed fluids entering the visualization chamber (1).

The gas sampling system includes a constant temperature water bath (28), a gas collection chamber (26), a third pressure sensor (29), and a third temperature sensor. The constant temperature water bath (28) is configured to cool the gases in the gas collection chamber (26), and the third temperature sensor is configured to obtain the temperature of the constant temperature water bath. The gas collection chamber (26) is in fluid communication with the bubble sampling tubing (10), which collects boiling bubbles from the mixed fluids in visualization chamber (1) into the gas collection chamber (26). The third pressure sensor (29) measures the pressure of the gases in the gas collection chamber (26), and when the pressure reaches a set value, indicating that the volume of gases in the gas collection chamber (26) has reached a set value, and then the gases collected in the gas collection chamber are cooled by the constant temperature water bath (28). During the cooling process, the gas pressure in the gas collection chamber is obtained by the third pressure sensor (29), and the temperature of the constant temperature water bath is obtained by the third temperature sensor. The third pressure sensor (29) and the third temperature sensor are connected to the data processing module, which is used to determine the component concentration of the boiling bubbles of the mixed fluids according to the gas pressure in the gas collection chamber and the temperature of the constant temperature water bath through the phase equilibrium principle.

The gas collection chamber collects gases from boiling bubbles produced by liquids with different component concentrations. The equilibrium pressure (or temperature) for gases with specific component concentrations is determined at certain temperatures (or pressures). Therefore, by querying the phase equilibrium data for the mixed working fluid based on the temperature and pressure in the gas collection chamber, the gas component concentrations can be determined.

The top of the gas collection chamber is welded with a threaded joint for a pressure sensor to connect the third pressure sensor, which measures the gas pressure inside the gas collection chamber.

A gas collection chamber valve (27) is also provided at the inlet of the gas collection chamber and is configured to connect with the bubble sampling tubing (10), enabling control of the opening and closing of the bubble sampling tubing (10).

The data collection system includes the data processing module, an image acquisition device, and a light source (32). The light source (32) is used to illuminate the mixed fluids inside the visualization chamber (1), and the image acquisition device is used to capture images of the boiling bubble behavior in the mixed fluids. The data processing module is connected to the image acquisition device and various sensors to analyze the collected data.

The image acquisition device uses a high-speed camera (31), which, along with the light source, is positioned at the front and rear of the visualization chamber to record the characteristics of bubble behavior during the boiling process of the mixed working fluid.

The data processing module processes data by determining the component concentrations of the boiling bubbles in the mixed fluids based on the gas pressure inside the gas collection chamber and the temperature of the constant temperature water bath; establishing a linear function of temperature as a function of distance from the top of the second heating element using the distance from the top of the second heating element to the second temperature sensor and the temperatures obtained by the second temperature sensor, and from this function, determining the top temperature of the second heating element and the slope of the linear function; calculating the heat flux density transferred from the second heating element to the mixed fluids based on the slope of the linear function and the thermal conductivity of the second heating element; and determining the boiling heat transfer coefficient at the top of the second heating element based on the heat flux density, the top temperature of the second heating element, and the temperature of the mixed fluids.

The specific process of studying the behavior characteristics of boiling bubbles in mixed fluids using the disclosed system for studying and testing the boiling bubble behavior characteristics of mixed fluids is as follows:

Step 1: fixing a ceramic heating sheet to the front and rear of the heating block by using thermal adhesive and inserting second temperature sensors into temperature measurement holes in the heating block, sequentially labeled from top to bottom as $T_1$, $T_2$, $T_3$, and $T_4$. Passing round holes around the fixing plate through fixed columns beneath the visualization chamber, pressing the fixing plate tightly against the visualization chamber, and fixing and compressing with nuts. Inserting the heating block through the square hole at the center of the fixing plate and adjusting a height so that the top surface of the heating block is slightly above the top surface of the fixing plate. Pouring epoxy resin adhesive into the gaps between the heating block, the fixing plate, and the visualization chamber to make the height of the epoxy resin adhesive level with the top surface of the heating block and waiting for the epoxy resin adhesive to solidify to achieve a seal. Adjusting the sleeve below the bubble collection tubing to an appropriate height and tightening the fixed pin. Applying the gasket, the organic glass window, and the window compression plate sequentially to the front and rear of the visualization chamber, passing bolts through their bolt holes, and tightening them with nuts. Screwing temperature sensors and the pressure sensors into their respective threaded joints on the visualization chamber and the gas collection chamber. Wrapping the insulating layer around the parts of a boiling system and the heating block that are in contact with the environment.

Step 2: connecting the inlet and outlet of the condensing coil to the inlet and outlet of the condensing water bath; connecting a flexible heating sheet to the temperature control cabinet, and the ceramic heating sheet to the adjustable DC power source; connecting a sensor signal line that measures the temperature of the mixed fluids to a temperature control, and connecting the remaining temperature and pressure sensor signal lines to a data acquisition card.

Step 3: closing the bubble sampling tubing valve, opening the bubble collection tubing valve and the injection tubing valve, injecting the prepared mixed working fluids through the injection tubing into the visualization chamber, then closing the injection tubing valve.

Step 4: turning on the temperature control cabinet, adjusting the preset temperature of the temperature control cabinet so that the flexible heating sheet heats the mixed working fluids to the first temperature value.

Step 5: starting the condensing water bath, allowing the condensing water to enter the condensing coil, and adjusting the temperature of the condensing water bath to regulate the pressure of the boiling system, thereby adjusting the pressure inside the visualization chamber.

Step 6: Turning on the adjustable DC power source and adjusting the output voltage to make the mixed working fluids boil and to fix the temperature of the heating block's top surface at a specific temperature; starting a high-speed camera and a light source to film the behavior of the boiling bubbles in the mixed working fluids under specified conditions, and using the data processing module to perform quantitative analysis of nucleation, growth, and detachment. Draining the gas inside the gas collection chamber and closing the gas collection chamber valve; connecting the gas collection chamber to the bubble sampling tubing, closing the bubble collection tubing valve, opening the bubble sampling tubing valve and the gas collection chamber valve to allow the collected boiling bubbles to enter the gas collection chamber, and once a certain amount of gas has been collected, closing the bubble sampling tubing valve and the gas collection chamber valve, opening the bubble collection tubing valve; starting the constant temperature water bath, adjusting the water bath temperature to a certain value, and placing the gas collection chamber in the constant temperature water bath to stand for a period of time, recording the temperature of the constant temperature water bath and the value of the pressure sensor from the gas collection chamber, and determining the component concentrations of the boiling bubbles based on physical properties.

Step 7: recording the values from the four temperature sensors in the temperature measurement holes in the heating block, fitting a linear function of temperature as a function of the distance from the top of the heating block, and calculating the temperature at the top of the heating block (i.e., when the distance is 0) based on the function; calculating the heat flux density transferred from the heating block to the mixed fluids using the slope of the linear function, wherein, the calculation formula is:

$$q = \lambda k.$$

Wherein, q is the heat flux density at which the heating block transfers heat to the mixed fluids, $W/m^2$. λ is the thermal conductivity of the heating block, W/(m·° C.). k is the slope of the obtained linear function, ° C./m.

Calculating the boiling heat transfer coefficient at the top of the heating block, wherein, the calculation formula is:

$$h = \frac{q}{T_w - T_f}.$$

Wherein, h is the boiling heat transfer coefficient at the top of the heating block, $W/m^2$·° C. $T_w$ is the top temperature of the heating block, ° C. $T_f$ is the temperature of the mixed fluids, ° C.

Step 8: repeating Steps 6 and 7 to study the behavior characteristics of boiling bubbles in mixed fluids under different heat flux densities from the heating block.

Step 9: repeating Steps 5 to 7 to study the behavior characteristics of boiling bubbles in mixed fluids under different pressure conditions.

Step 10: repeating Steps 4 to 7 to study the behavior characteristics of boiling bubbles in mixed fluids under different degree of under cooling conditions of the mixed fluids.

Step 11: repeating Steps 3 to 7 to study the behavior characteristics of boiling bubbles in mixed fluids under different component concentration conditions.

Step 12: replacing the heating block and repeating Steps 1 to 7 to study the enhancement methods of boiling in mixed fluids on conventional surfaces with different roughness and enhanced surfaces with different micro-nanostructural parameters.

The test system disclosed in this example is capable of conducting research on the behavior characteristics and enhancement methods of boiling bubbles in mixed working fluids under various conditions of pressure, heat flux density, degree of under cooling, and component concentration, and collecting boiling bubbles to determine component concentrations of the boiling bubbles. The system is capable of controlling the pressure of the boiling system by adjusting the temperature of the condensing water bath; controlling the heat flux density and the top temperature of the heating block by adjusting the output voltage of the adjustable DC power source; controlling the degree of under cooling of the mixed fluids by setting the temperature in the temperature control cabinet; conducting research on the behavior characteristics of boiling bubbles in mixed working fluids under different component concentrations by changing the mixed working fluids with different ratios; processing heating copper blocks with different top surface structures to study the behavior characteristics of boiling bubbles in mixed working fluids, comprehensively comparing the behavior characteristics of boiling bubbles and heat transfer coefficients, optimizing surface structure parameters, and determining methods for enhancing heat transfer in boiling mixed working fluids; measure temperatures at different heights on the side of the heating block through temperature measurement holes, theoretically calculating the heat flux density and the top temperature of the heating block, thereby reducing experimental errors due to heat leakage from the heating block compared to determining the heat flux density using an adjustable power source; designing a bubble collection tubing that can collect boiling bubbles, extending the bubble collection tubing into the boiling visualization chamber in a sleeve form, adjusting the height of the sleeve so that the sleeve opening is below the surface of the mixed fluids, reducing errors caused by evaporation of the liquid surface on gas collection; heating the mixed fluids using flexible heating sheets applied to the external sides of the boiling visualization chamber to prevent boiling bubbles generated by heating rods placed inside the boiling visualization chamber, which could affect the experimental results of the collected bubbles; designing a gas sampling system, collecting boiling bubbles in a gas collection chamber, placing the gas collection chamber in a constant temperature water bath, and measuring the pressure in the gas collection chamber, which allows for the convenient and economical determination of the component concentration of boiling bubbles in mixed working fluids based on phase equilibrium data; equipped with high-resolution cameras and light sources, capable of filming and recording micro-level bubbles, and using post-processing software for quantitative analysis.

Example 2

In the example, the present invention proposes a method for studying and testing the boiling bubble behavior characteristics of mixed fluids, which includes:

- heating the mixed fluids in a visualization chamber using a heating device to generate boiling bubbles;
- collecting the boiling bubbles generated in the mixed fluids within the visualization chamber using a gas collection chamber;
- cooling the boiling bubbles collected by the gas collection chamber using a constant temperature water bath when a volume of boiling bubbles in the gas collection chamber reaches a set value;
- obtaining gas pressure inside the gas collection chamber and temperature of the constant temperature water bath during cooling;
- determining component concentration of the boiling bubbles in the mixed fluids based on the gas pressure inside the gas collection chamber and the temperature of the constant temperature water bath.

It should be noted that the examples described above are intended solely to illustrate the technical solutions of the present invention and are not restrictive. Despite the detailed description of the present invention with reference to these examples, those skilled in the relevant field should understand that modifications to the specific implementations of the present invention can still be made or equivalent substitutions made without departing from the spirit and scope of the present invention. Any such modifications or equivalent replacements should be included within the scope of protection defined by the claims of the present invention.

The invention claimed is:

1. A system for studying and testing the boiling bubble behavior characteristics of mixed fluids, comprising a visualization chamber, a heating device, a constant temperature water bath, a gas collection chamber, a third pressure sensor, a third temperature sensor, and a data processing module;

the visualization chamber is configured to contain mixed fluids; the heating device is configured to heat the mixed fluids within the visualization chamber to generate boiling bubbles; the gas collection chamber is configured to collect boiling bubbles generated in the mixed fluids within the visualization chamber; the constant temperature water bath is configured to cool the boiling bubbles collected by the gas collection chamber; the third pressure sensor is configured to obtain gas pressure inside the gas collection chamber; the third temperature sensor is configured to obtain temperature of the constant temperature water bath; the data processing module is configured to determine component concentration of the boiling bubbles in the mixed fluids based on the gas pressure inside the gas collection chamber and the temperature of the constant temperature water bath.

2. The system as claimed in claim 1, wherein the heating device comprises a first heating element and a second heating element, the first heating element being configured to heat the mixed fluids in the visualization chamber to a first temperature value; the second heating element being provided at the bottom of the internal chamber of the visualization chamber, being configured to continue to heat the mixed fluids which has reached the first temperature value, and to keep a temperature of the second heating element at a second temperature value at all times, to make the mixed fluids to generate boiling bubbles.

3. The system as claimed in claim 2, wherein the first heating element is provided on the exterior of the visualization chamber, and the first heating element is connected to a temperature control cabinet.

4. The system as claimed in claim 2, wherein the second heating element comprises a heating block, a heating sheet, and a fixing plate; the heating sheet is provided at the bottom of heating block, and the bottom of heating block is also connected to the fixing plate; the fixing plate is fixed on the bottom of the internal chamber of the visualization chamber, and the top of the heating block extends into the mixed fluids.

5. The system as claimed in claim 1, wherein the visualization chamber is further in fluid communication with an injection tubing and a bubble collection tubing, respectively, and both the bubble collection tubing and the injection tubing are in fluid communication with a condenser.

6. The system as claimed in claim 5, wherein the bubble collection tubing is further in fluid communication with one end of a bubble sampling tubing and the other end of the bubble sampling tubing is in fluid communication with the gas collection chamber.

7. The system as claimed in claim 5, wherein one end of the bubble collection tubing is in fluid communication with the condenser and the other end extends into the mixed fluids in the visualization chamber.

8. The system as claimed in claim 1, wherein further comprising a first temperature sensor and a plurality of second temperature sensors;

the first temperature sensor is configured to obtain a temperature of the mixed fluids in the visualization chamber;

the plurality of second temperature sensors is configured to obtain temperatures at different distances from the top of a second heating element;

the data processing module is further configured to establish a linear function of temperature as a function of distance from the top of the second heating element using the distance from the top of the second heating element to the second temperature sensor and the temperatures obtained by the second temperature sensor, and from this function, determine the top temperature of the second heating element and the slope of the linear function;

calculate the heat flux density transferred from the second heating element to the mixed fluids based on the slope of the linear function and the thermal conductivity of the second heating element; and determine the boiling heat transfer coefficient at the top of the second heating element based on the heat flux density, the top temperature of the second heating element, and the temperature of the mixed fluids.

9. The system as claimed in claim 1, wherein an image acquisition device connected to the data processing module is also provided, and the image acquisition device is configured to obtain an image of the boiling bubble behavior of the mixed fluids.

10. A method for testing the system as claimed in claim 1, comprising:

- heating the mixed fluids in a visualization chamber using a heating device to generate boiling bubbles;
- collecting the boiling bubbles generated in the mixed fluids within the visualization chamber using a gas collection chamber;
- cooling the boiling bubbles collected by the gas collection chamber using a constant temperature water bath when a volume of boiling bubbles in the gas collection chamber reaches a set value;

obtaining gas pressure inside the gas collection chamber and temperature of the constant temperature water bath during cooling; and determining component concentration of the boiling bubbles in the mixed fluids based on the gas pressure inside the gas collection chamber and the temperature of the constant temperature water bath.

11. A method for testing the system as claimed in claim 2, comprising:

heating the mixed fluids in a visualization chamber using a heating device to generate boiling bubbles;

collecting the boiling bubbles generated in the mixed fluids within the visualization chamber using a gas collection chamber;

cooling the boiling bubbles collected by the gas collection chamber using a constant temperature water bath when a volume of boiling bubbles in the gas collection chamber reaches a set value;

obtaining gas pressure inside the gas collection chamber and temperature of the constant temperature water bath during cooling; and determining component concentration of the boiling bubbles in the mixed fluids based on the gas pressure inside the gas collection chamber and the temperature of the constant temperature water bath.

12. A method for testing the system as claimed in claim 3, comprising:

heating the mixed fluids in a visualization chamber using a heating device to generate boiling bubbles;

collecting the boiling bubbles generated in the mixed fluids within the visualization chamber using a gas collection chamber;

cooling the boiling bubbles collected by the gas collection chamber using a constant temperature water bath when a volume of boiling bubbles in the gas collection chamber reaches a set value;

obtaining gas pressure inside the gas collection chamber and temperature of the constant temperature water bath during cooling; and determining component concentration of the boiling bubbles in the mixed fluids based on the gas pressure inside the gas collection chamber and the temperature of the constant temperature water bath.

13. A method for testing the system as claimed in claim 4, comprising:

heating the mixed fluids in a visualization chamber using a heating device to generate boiling bubbles;

collecting the boiling bubbles generated in the mixed fluids within the visualization chamber using a gas collection chamber;

cooling the boiling bubbles collected by the gas collection chamber using a constant temperature water bath when a volume of boiling bubbles in the gas collection chamber reaches a set value;

obtaining gas pressure inside the gas collection chamber and temperature of the constant temperature water bath during cooling; and determining component concentration of the boiling bubbles in the mixed fluids based on the gas pressure inside the gas collection chamber and the temperature of the constant temperature water bath.

14. A method for testing the system as claimed in claim 5, comprising:

heating the mixed fluids in a visualization chamber using a heating device to generate boiling bubbles;

collecting the boiling bubbles generated in the mixed fluids within the visualization chamber using a gas collection chamber;

cooling the boiling bubbles collected by the gas collection chamber using a constant temperature water bath when a volume of boiling bubbles in the gas collection chamber reaches a set value;

obtaining gas pressure inside the gas collection chamber and temperature of the constant temperature water bath during cooling; and determining component concentration of the boiling bubbles in the mixed fluids based on the gas pressure inside the gas collection chamber and the temperature of the constant temperature water bath.

15. A method for testing the system as claimed in claim 6, comprising:

heating the mixed fluids in a visualization chamber using a heating device to generate boiling bubbles;

collecting the boiling bubbles generated in the mixed fluids within the visualization chamber using a gas collection chamber;

cooling the boiling bubbles collected by the gas collection chamber using a constant temperature water bath when a volume of boiling bubbles in the gas collection chamber reaches a set value;

obtaining gas pressure inside the gas collection chamber and temperature of the constant temperature water bath during cooling; and determining component concentration of the boiling bubbles in the mixed fluids based on the gas pressure inside the gas collection chamber and the temperature of the constant temperature water bath.

16. A method for testing the system as claimed in claim 7, comprising:

heating the mixed fluids in a visualization chamber using a heating device to generate boiling bubbles;

collecting the boiling bubbles generated in the mixed fluids within the visualization chamber using a gas collection chamber;

cooling the boiling bubbles collected by the gas collection chamber using a constant temperature water bath when a volume of boiling bubbles in the gas collection chamber reaches a set value;

obtaining gas pressure inside the gas collection chamber and temperature of the constant temperature water bath during cooling; and determining component concentration of the boiling bubbles in the mixed fluids based on the gas pressure inside the gas collection chamber and the temperature of the constant temperature water bath.

17. A method for testing the system as claimed in claim 8, comprising:

heating the mixed fluids in a visualization chamber using a heating device to generate boiling bubbles;

collecting the boiling bubbles generated in the mixed fluids within the visualization chamber using a gas collection chamber;

cooling the boiling bubbles collected by the gas collection chamber using a constant temperature water bath when a volume of boiling bubbles in the gas collection chamber reaches a set value;

obtaining gas pressure inside the gas collection chamber and temperature of the constant temperature water bath during cooling; and determining component concentration of the boiling bubbles in the mixed fluids based on the gas pressure inside the gas collection chamber and the temperature of the constant temperature water bath.

18. A method for testing the system as claimed in claim 9, comprising:

heating the mixed fluids in a visualization chamber using a heating device to generate boiling bubbles;

collecting the boiling bubbles generated in the mixed fluids within the visualization chamber using a gas collection chamber;

cooling the boiling bubbles collected by the gas collection chamber using a constant temperature water bath when a volume of boiling bubbles in the gas collection chamber reaches a set value;

obtaining gas pressure inside the gas collection chamber and temperature of the constant temperature water bath during cooling; and determining component concentration of the boiling bubbles in the mixed fluids based on the gas pressure inside the gas collection chamber and the temperature of the constant temperature water bath.

* * * * *